US006646613B1

(12) United States Patent
Cheng

(10) Patent No.: US 6,646,613 B1
(45) Date of Patent: Nov. 11, 2003

(54) VEHICLE ANTENNA LIGHT

(76) Inventor: John C. Cheng, 768 S. Turnbull Canyon Rd., City of Industry, CA (US) 91745

( * ) Notice: Subject to any disclaimer, the term of this patent is extended or adjusted under 35 U.S.C. 154(b) by 0 days.

(21) Appl. No.: 10/104,314

(22) Filed: Mar. 25, 2002

(51) Int. Cl.$^7$ .................................................. H01Q 1/06
(52) U.S. Cl. ...................................... 343/721; 343/713
(58) Field of Search ................................ 343/711, 713, 343/721, 894, 720, 760, 715, 714, 906; 116/209, 28 R

(56) References Cited

U.S. PATENT DOCUMENTS 5,572,225 A * 11/1996 McCarthy ................... 343/720
6,377,222 B1 * 4/2002 Nicholson ................... 343/713

* cited by examiner

Primary Examiner—James Clinger
(74) Attorney, Agent, or Firm—Albert O. Cota

(57) ABSTRACT

A vehicle antenna light assembly (10) that is adapted to be removably attached to a vehicle antenna tip (90) as located on a vehicle antenna (92). The assembly (10) is comprised of an electronic light enclosure (12) that encloses a battery powered electronic light circuit (80) that sequentially activates a set of LED'S when the external environment is dark and the vehicle is moving. The enclosure (12) is attached to the antenna tip (90) by utilizing an enclosure attachment cup (32), a central attachment structure (42), and a compression washer (68). The attachment is accomplished by attaching the structure (42) to a lower section (18) of the enclosure (12). The cup (32) followed by the compression washer (68) is then inserted over the antenna (90) and the cup (32) is attached to a cup attachment cavity (60) located on the structure (42). When the attachment sequence is complete, the washer (68) bias the antenna tip (90) against the base (44) of the structure (42) to maintain a rigid attachment.

18 Claims, 2 Drawing Sheets

VEHICLE ANTENNA LIGHT

TECHNICAL FIELD

The invention pertains to the general field of vehicle novelty lights and more particularly to a light that is attached to the tip of a vehicle antenna and that illuminates when darkness appears and the vehicle is moving.

BACKGROUND ART

Vehicles have long been modified by adding aftermarket accessories to enhance the aesthetics of the vehicle and/or to reflect the personality of the vehicle's owner. Typical enhancements include, but are not limited to, special vehicle paints such as metallic and flake finishes, various designs of alloy wheels, pin stripping and simulated flames, and various add-on lights. The additional lights, which are typically added to license plate frames can consist of blinking lights or a neon light that surrounds the license plate frame, gear shift lights and tire valve lights that illuminate when the vehicle wheels rotate. The use of lights can add decorative, dramatic and highly visible alterations without having to make major changes to the vehicle itself.

A search of the prior art, which included patents and related literature, did not disclose any lights that attach the top of a vehicle antenna. However, the following U.S. patents that cover attachment structures are considered related:

| PATENT NO. | INVENTOR | ISSUED |
| --- | --- | --- |
| 6,119,714 | Otzen | 19 Sep. 2000 |
| 6,102,064 | Robinson | 15 Aug. 2000 |
| 5,341,833 | Davis | 30 Aug. 1994 |

The U.S. Pat. No. 6,119,714 issued to otzen discloses a valve cap for an installation having interior air pressure. The cap includes an upper sleeve portion with a central recess for receiving a pair of pressure indicating inserts. The inserts are received in the recess, and each displays one digit of a desired inflation pressure on its upper surface.

The U.S Pat. No. 6,102,064 issued to Robinson discloses a theft resistant valve cap including a liner adapted for threaded engagement with a standard pneumatic tire stem valve, a sleeve rotatably mounted with the liner to shroud it and an interlocking feature to selectively prevent axial displacement between the liner and the sleeve. The interlocking feature includes a screw threaded into an aperture in the sleeve. The screw can be removed after the valve cap has been installed, in this fashion, the liner and the sleeve are in a fixed axial position with respect to each other.

The U.S. Pat. No. 5,341,833 issued to Davis discloses a tire valve cap for a flush mounted tire valve which seals the tire valve against external debris and internal leakage. Slits located in the wall of the cap allow the cap to act like a spring after insertion and to permit any internal leakage to intensify the sealing properties of the cap to the valve.

DISCLOSURE OF THE INVENTION

The vehicle antenna light assembly is designed to function as a novelty light that is easily attached or detached from the tip of a vehicle antenna. In its basic design, the assembly consist of:

a) an electronic light enclosure that encloses a battery powered electronic light circuit having means for activating at least one LED and, b) means for removably attaching the electronic light enclosure to the vehicle antenna tip.

The electronic enclosure is dimensioned to include all the circuit elements and batteries to operate the at least one LED that automatically illuminates when the external environment is dark and the vehicle is moving. The batteries consist of button batteries that are easily accessible when replacement is required on the upper edge of the enclosure is attached a transparent cap. The cap can be designed to include a reflecting lens that increases the LED illumination and provides side illumination.

The invention features an antenna tip attachment means that allows the assembly to be quickly, safely and rigidly attached to the antenna tip. The antenna mounting means utilizes the electronic light enclosure which has a threaded lower section, in combination with a central attachment structure having a base with a lower surface that includes a concave section, an upper, threaded enclosure attachment cavity and a lower, threaded cup attachment cavity; an enclosure attachment cup having internal threads, an antenna tip opening; and a compression washer. The attachment is accomplished as follows:

1. The upper threaded cavity of the central attachment structure is threaded into the threaded lower section of the electronic light enclosure,
2. The enclosure attachment cup is inserted over the antenna followed by the insertion of the resilient washer, and
3. The enclosure attachment cup is threaded into the lower cup attachment cavity of the central attachment structure and tightened with the resilient washer applying a bias pressure to the the vehicle antenna tip which is placed against the concave section of the central attachment structure to thus, securely attach the vehicle antenna light assembly to the antenna tip.

In some vehicles, the diameter of the antenna tip is smaller than the diameter of the antenna tip opening on the enclosure attachment cup which requires additional support to secure the assembly to the antenna tip. In this case a metal washer is inserted between the resilient washer and the cup. The washer has a smaller diameter which allows the antenna tip to remain within the confines of the cup opening.

In view of the above disclosure, it is the primary object of the invention to produce a vehicle novelty light that when attached to the tip of a vehicle antenna, the light will illuminate whenever the external environment is dark and when the vehicle is moving.

In addition to the primary object of the invention it is also an object of the invention to produce a vehicle antenna light that:

is easily attached and removed from the vehicle's antenna tip, can be produced with various colors of LED's, adds to the aesthetics of the vehicle antenna, automatically illuminates when the external environment is dark and the vehicle is moving, can be adapted to be used in various type of land vehicles or boats, and is cost effective from both a manufacturer's and consumer's points of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
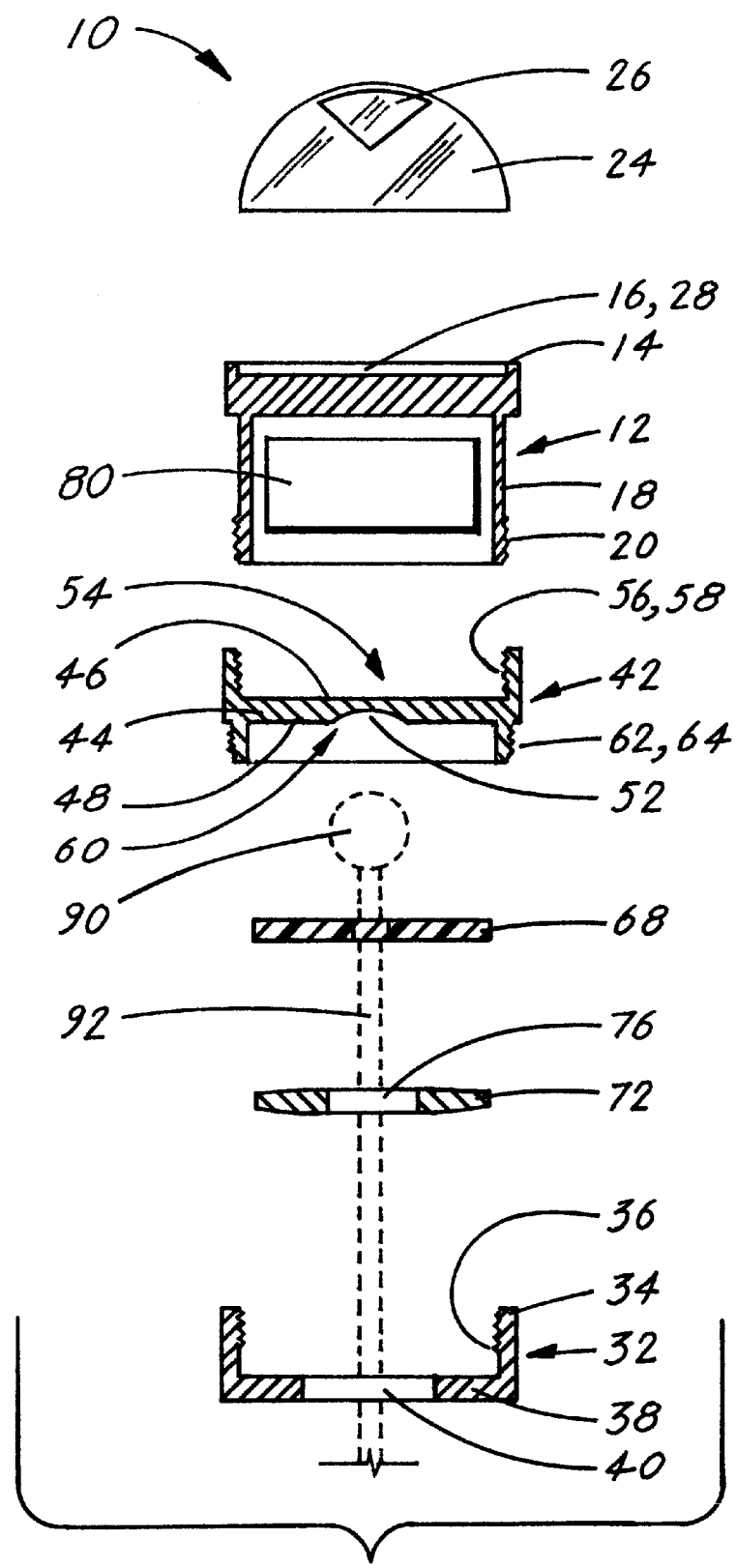
FIG. 1 is an exploded sectional view showing all the elements that comprise the vehicle antenna light assembly with their respective position on the vehicle antenna shown in broken lines.

The best mode for carrying out the invention is presented in terms of a preferred embodiment for a vehicle antenna light assembly 10, that is adapted to be attached to a vehicle antenna tip 90. The assembly becomes operational when the external environment is dark and the vehicle is moving. The preferred embodiment, for the assembly 10, as shown in FIGS. 1–6, is comprised of the following major elements: an electronic light enclosure 12, a transparent cap 24, an enclosure attachment cup 32, a central attachment structure 42, a compression washer 68 and an optional metal washer 72.

Figure 2:
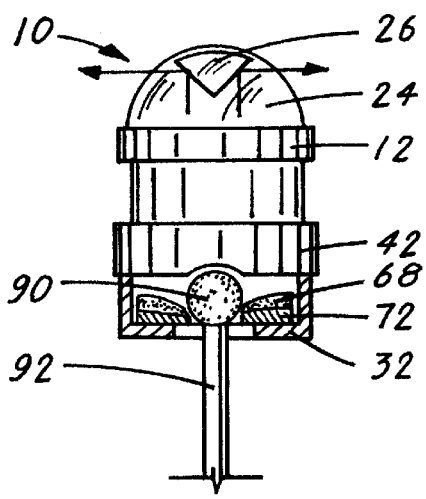
FIG. 2 is a side elevational view of a vehicle antenna light assembly attached to a vehicle antenna having an antenna tip diameter that requires the use of a metal washer.
Figure 3:
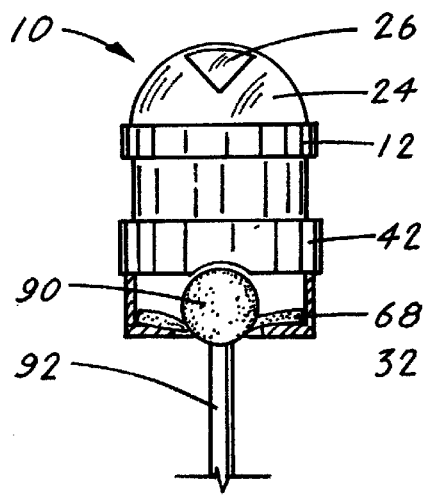
FIG. 3 is a side elevational view of a vehicle antenna light assembly attached to a vehicle antenna having an antenna tip diameter that precludes the need for using a metal washer.

The electronic light enclosure 12, as shown in FIGS. 1, 2 and 3 includes an upper edge 14, a stepped cavity 16 and a lower section 18 that has a set of external threads 20. To the upper edge 14 is attached the transparent cap 24 by an attachment means 28. The cap attachment means can simply consist of an adhesive that is applied to the edge of cap 24 and the upper edge 14 of the enclosure 12. Preferably, however, the attachment means 28 consists of the enclosure 12 having a stepped cavity 16, as shown in FIG. 1, into which is frictionally inserted the transparent cap 24. An adhesive can also be applied to the interfacing edges to provide additional security.

The transparent cap 24 can be made of transparent plastic and can be molded to include a reflecting lens 26 as shown in FIGS. 2 and 3. The lens 26 allows light to be reflected to the side of the transparent cap 24 to further increase the visibility of the assembly 12.

Figure 6:
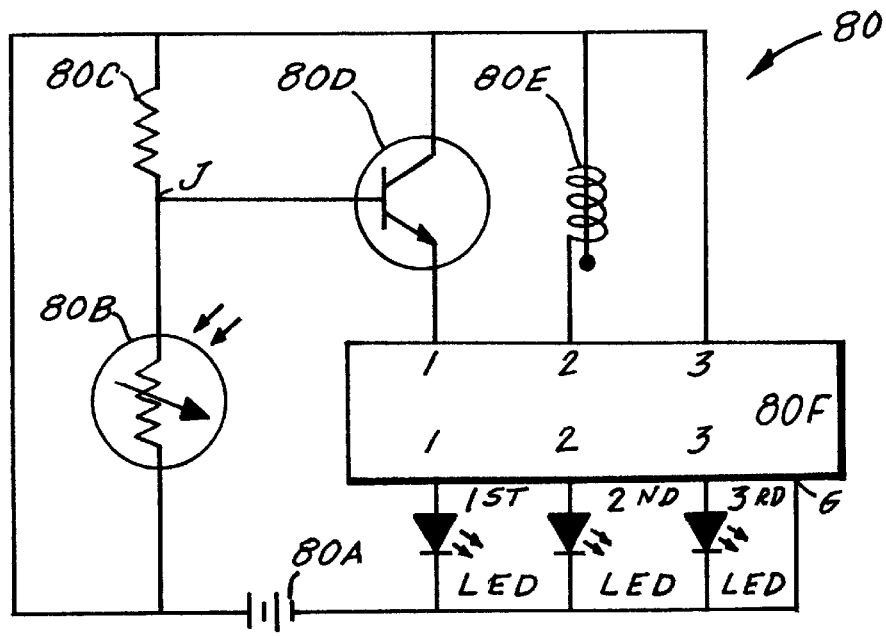
FIG. 6 is a schematic diagram of an electronic light circuit.

The electronic light enclosure 12 is dimensioned to enclose an electronic light circuit 80, as shown in FIG. 6, that is enabled when the surrounding environment is dark and the vehicle is moving. The circuit 80 is comprised of the following major elements: a battery 80A having a positive terminal and a negative terminal, a photo sensor 80B, a resistor 80O, an NPN transistor 80D, a shark sensor 80E, a logic network 80F and a plurality of LEDs.

The photo sensor 80B has a first lead connected to the Positive terminal of the battery 80A and a second lead connected to a first side of the resistor 80C. The second side of the resistor 80C is connected to the positive terminal of the battery 80A. The base of the NPN transistor 80D is connected to a junction (J) formed between the second lead of the photo sensor 80B and the first side of the resistor 80. The collector of the transistor 80D is connected to the positive terminal of the battery 80A. The shark sensor 80E incorporates a pole and a coil. The Pole is connected to the positive terminal of the battery 80A. A logic network 80F in a preferred architecture has a first input, a second input, a third input, a first output, a second output, a third output, and a circuit ground G which is connected to the negative terminal of the battery 80A. The first input is connected to the emitter of the transistor 80D, the second input is connected to the coil of the shark sensor 80E, and the third input is connected to the positive terminal of the battery 80A.

The plurality of LEDs in the preferred architecture consist of a first LED, a second LED, and a third LED.

Each LED has an anode and a cathode. The cathodes of each LED are connected to the negative terminal of the battery 80A. The anode of the first LED is connected to the first output of the logic network 80F, the anode of the second LED is connected to the second output of the network 80F, and the anode of the third LED is connected to the third output of the network 80F.

When the environment is dark, the photo sensor 80B has a high resistance which produces a high voltage at the junction J. This high voltage is applied to the base of the NPN transistor 80D which enables the transistor causing a positive signal to be applied to the first input of the logic network 80F.

When the vehicle is moving the vehicle antenna 92 vibrates which causes the pole of the shark sensor 80E to make contact with the coil of the shark sensor. This contact also allows a positive signal to be applied to the second input of the network 80F. The simultaneous application of both of the positive signals allows the logic network 80F to become enabled and produce a sequential LED activation signal at the first, second and third outputs of the circuit 80F. The LED sequential activation signal turns on the particular LED that is in the sequential logic signal path. The logic integrated circuit 80F is further designed to allow the LED signals to remain ON for a period of five seconds at which time the electronic light circuit 80 shuts down if a second set of positive signals is not generated and applied to the logic network.

The enclosure attachment cup 32 as shown in FIGS. 1, 2 and 3, has a side wall 34 that surrounds a base 38 having a substantially centered antenna tip opening 40. In the preferred design, the side wall 34 includes a set of internal threads 36 that are dimensioned to be attached to the central attachment structure as described infra.

The central attachment structure 42, as shown in FIGS. 1, 2 and 3, is comprised of a base 44, an enclosure attachment cavity 54 and a cup attachment cavity 60. The base 44 has an upper surface 46, a lower surface 40, a substantially centered antenna tip opening 50 and a concave section 52 located on the lower surface 40 over the antenna tip opening 50. The concave section 52 is dimensioned to substantially encompass the Upper surface of the antenna tip 90.

The enclosure attachment cavity 54 extends upward from the upper surface 46 of the base 44 and has a means for being removably attached to the lower section 18 of the electronic light enclosure 12.

The cup attachment cavity 60 extends downward from the lower surface 48 of the base 44 and has a means for being removably attached to the enclosure attachment cup 32.

The preferred means for removably attaching the central attachment structure 42 to the electronic light enclosure 12 consists of having the lower section 18 of the enclosure 12 include a set of external threads 20.

The enclosure attachment cavity 54 on the central attachment structure 42 has a set of internal threads 58 that are dimensioned to receive the external threads 20 on the lower section 18 of the enclosure 12. Likewise, the preferred means for removably attaching the central attachment structure 42 to the enclosure attachment cup consists of having the cup attachment cavity 60 on the central attachment structure 42 include a set of external threads 64. The side wall 34 on the enclosure attachment cup 32 has a set of internal threads 36 that are dimensioned to receive the external threads 64 on the cup attachment cavity 60.

Figure 4:
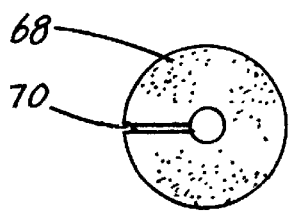
FIG. 4 is a plan view of the compression washer.

The final two elements that comprise the assembly 12 are the compression washer 68 and the metal washer 72. The compression washer 68, as shown in FIG. 4 is preferably made of neoprene rubber and has a lateral slit to allow the washer 68 to easily conform to its compressive shape. The washer typically has a diameter of 0.70-inches (1.79 cm), a thickness of 0.625-inches (0.159 cm) and a center opening of 0.125-inches (0.318 cm).

Figure 5:
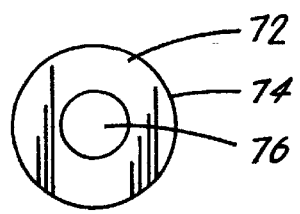
FIG. 5 is a plan view of the metal washer.

The metal washer 72, as shown in FIG. 5, is preferably made of aluminum and has an outside diameter that allows the washer to fit into and against the base of the enclosure attachment cup 32. The washer 72 further has a substantially centered opening having a diameter that is less than the diameter of the antenna tip opening 40 on the enclosure attachment cup 32 and less than the diameter of the vehicle antenna tip 90. The metal washer is only used with a vehicle antenna 92 having an antenna tip 90 diameter that is less than the diameter of the antenna tip opening 40 on the enclosure attachment cup 32.

The vehicle antenna light assembly 10 is attached to the vehicle antenna tip 90 when:

1. The central attachment structure 42 is attached to the lower section 18 of the electronic light enclosure 12,
2. The enclosure attachment cup 32 is inserted over the vehicle antenna 92,
3. The compression washer 68 is inserted over the antenna 92 between the central attachment structure 42 and the enclosure attachment cup 32, and
4. The enclosure attachment cup 32 is attached to the cup attachment cavity 60 on the central attachment structure 42. When the above sequence is followed, the upper surface of the antenna tip 90 is juxtaposed against the concave section 52 on the base 44 of the central attachment structure 42 with the compression ,washer 68 biasing the antenna tip 90 against the concave section 52.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. A vehicle antenna light assembly adapted to be placed over and be removably attached to a vehicle antenna tip having an upper surface and a lower surface, said assembly comprising:
    a) an electronic light enclosure that encloses a battery powered electronic light circuit having means for automatically activating at least one LED only when the external environment is dark and when the vehicle is moving, and
    b) means for removably attaching said electronic light enclosure to the vehicle antenna tip.

2. The assembly as specified in claim 1 wherein said means for removably attaching said electronic light enclosure to the vehicle antenna tip comprises:
    a) said electronic light enclosure further comprises an upper edge, a lower externally threaded section, and a transparent cap attached, by an attachment means, to the upper edge,
    b) an enclosure attachment cup having a side wall that surrounds a base, with the side wall further having a set of internal threads, and the base having a substantially centered antenna tip opening,
    c) a central attachment structure comprising:
        (1) a base having an upper surface, a lower surface, a substantially centered antenna tip opening, and a concave section located on the lower surface over the antenna tip opening, wherein the concave section is dimensioned to substantially encompass the upper surface of the antenna tip,
        (2) an enclosure attachment cavity extending upward from the upper surface of the base and having a set of internal threads that are dimensioned to be threaded into the external threads on said electronic light enclosure,
        (3) a cup attachment cavity extending downward from the lower surface of the base and having a set of external threads, and
    d) a resilient compression washer inserted into the vehicle antenna between said central attachment structure and said enclosure attachment cup, wherein said vehicle antenna light assembly is removably attached to the antenna tip when:
        (1) said central attachment structure is threaded to the lower threaded section of a said electronic light enclosure,
        (2) said enclosure attachment cup is inserted over the antenna,
        (3) said compression washer is inserted over the antenna, and
        (4) said enclosure attachment cup is threaded to the cup attachment cavity on said central attachment structure, at which time the upper surface of the antenna tip is juxtaposed against the concave section on the base of said central attachment structure with the compression washer biasing the antenna tip against the concave section.

3. The assembly as specified in claim 2 wherein said transparent cap further comprises a reflecting lens.

4. The assembly as specified in claim 3 wherein said means for attaching said transparent cap to the upper edge of said electronic light enclosure comprises an adhesive.

5. The assembly as specified in claim 2 wherein said compression washer is formed of neoprene rubber.

6. The assembly as specified in claim 2 further comprising a metal washer having an outside diameter that allows said washer to fit into and against the base of said enclosure attachment cup, said washer further having a substantially centered opening having a diameter that is less than the diameter of the antenna tip opening on said enclosure attachment cup and less than the diameter of the vehicle antenna tip, wherein said metal washer is only used with vehicle antennas having an antenna tip diameter that is less than the diameter of the antenna tip opening on said enclosure attachment cup.

7. A vehicle antenna light assembly adapted to be placed over and be removably attached to a vehicle antenna tip having an upper surface and a lower surface, said assembly comprising:
    a) an electronic light enclosure having an upper edge, a lower section and that is dimensioned to enclose an electronic light circuit,
    b) a transparent cap having means for being attached to the upper edge of said enclosure.

c) an enclosure attachment cup having a side wall that surrounds a base having a substantially centered antenna tip opening, d) a central attachment structure comprising:
  (1) a base having an upper surface, a lower surface, a substantially centered antenna tip opening and a concave section located on the lower surface over the antenna tip opening, wherein the concave section is dimensioned to substantially encompass the upper surface of the antenna tip,
  (2) an enclosure attachment cavity extending upward from the upper surface of the base and having means for being removably attached to the lower section of said electronics light enclosure, and
  (3) a cup attachment cavity extending downward from the lower surface of the base and having means for being removably attached to said enclosure attachment cup, e) a resilient compression washer inserted into the vehicle antenna between said central attachment structure and said enclosure attachment cup, wherein said vehicle antenna light assembly is attached to the vehicle antenna tip when:
  (1) said central attachment structure is attached to the lower section of said electronic light enclosure,
  (2) said enclosure attachment cup is inserted over the antenna,
  (3) said compression washer is inserted over the antenna between said central attachment structure and said enclosure attachment cup, and
  (4) said enclosure attachment cup is attached to the cup attachment cavity on said central attachment structure at which time the upper surface of the antenna tip is juxtaposed against the concave section on the base of said central attachment structure with the compression washer biasing the antenna tip against the concave section.

8. The assembly as specified in claim 7 wherein said electronic light circuit comprises:
  a) a battery having a positive terminal and a negative terminal,
  b) a photo sensor having a first lead connected to the positive terminal of said battery and a second lead connected to a first side of a resistor having a second side connected to the positive terminal of said battery,
  c) an NPN transistor having a base, an emitter and a collector, wherein the base is connected to a junction formed between the second lead of said photo sensor and the first side of said resistor, and the collector is connected to the positive terminal of said battery,
  d) a shark sensor having a pole and a coil, wherein the pole is connected to the positive terminal of said battery,
  e) a logic network having a first input, a second input, a third input, a first output, a second output, a third output, and a circuit ground connected to the negative terminal of said battery, wherein the first input is connected to the emitter of said transistor, the second input is connected to the coil of said shark sensor, and the third input is connected to the positive terminal of said battery, and
  f) a first LED, a second LED, and a third LED, wherein each LED has an anode and a cathode, wherein the cathodes of each LED are connected to the negative terminal of said battery, and the anode of the first LED is connected to the first output of said logic network, the anode of the second LED is connected to the second output of said logic network, and the anode of the third LED is connected to the third output of the logic network, wherein when the external environment is dark, the photo sensor produces a high voltage that is applied to and enables said transistor which then causes a positive signal to be applied to the first input of said logic network, wherein when the vehicle is moving, the pole and the coil of said photo sensor make contact causing a positive signal to be applied to the second input of said logic network, wherein when the two positive signals are simultaneously applied, said logic network is enabled and produces a sequential LED activation signal that is applied in a sequence to the particular LED that is in the sequential logic signal path.

9. The assembly as specified in claim 7 wherein said means for attaching the transparent cap to the upper edge of said enclosure comprises said upper edge of said enclosure further having a stepped cavity into which is frictionally inserted said transparent cap.

10. The assembly as specified in claim 9 wherein said means further comprises an adhesive.

11. The assembly as specified in claim 10 wherein said transparent cap further comprises a reflecting lens.

12. The assembly as specified in claim 7 wherein said means for removably attaching said central attachment structure to said electronics light enclosure comprises:
  a) the lower section of said electronic light enclosure having a set of external threads, and
  b) the enclosure attachment cavity having a set of internal threads dimensioned to receive the external threads on the lower section of said electronic light enclosure.

13. The assembly as specified in claim 7 wherein said means for removably attaching said central attachment structure to said enclosure attachment cup comprises:
  a) the cup attachment cavity of said central attachment structure having a set of external threads, and
  b) the side wall of said enclosure attachment cup having a set of internal threads dimensioned to receive the external threads on said cup attachment cavity.

14. The assembly as specified in claim 7 wherein said resilient compression washer is formed of neoprene rubber.

15. The assembly as specified in claim 14 wherein said resilient compression washer further comprises a lateral slit to allow said washer to easily conform to its compressive shape.

16. The assembly as specified in claim 7 further comprising a washer having an outside diameter that allows said washer to fit into and against the base of said enclosure attachment cup, said washer further having a substantially centered opening having a diameter that is less than the diameter of the antenna tip opening on said enclosure attachment cup and less than the diameter of the vehicle antenna tip, wherein said metal washer is only used with vehicle antennas having an antenna tip diameter that is less than the diameter of the antenna tip opening on said enclosure attachment cup.

17. The assembly as specified in claim 16 wherein said washer is made of metal.

18. The assembly as specified in claim 17 wherein said metal is aluminum.

* * * * *